(12) United States Patent
Brizzolara

(10) Patent No.: US 6,780,918 B2
(45) Date of Patent: Aug. 24, 2004

(54) PROCESS FOR THE PREPARATION OF PROTECTIVE COLLOID-STABILIZED AQUEOUS DISPERSIONS

(75) Inventor: Davide Brizzolara, Herten (DE)

(73) Assignee: PolymerLatex GmbH & Co.KG., Marl (DE)

( * ) Notice: Subject to any disclaimer, the term of this patent is extended or adjusted under 35 U.S.C. 154(b) by 29 days.

(21) Appl. No.: 10/366,311

(22) Filed: Feb. 14, 2003

(65) Prior Publication Data

US 2003/0176571 A1 Sep. 18, 2003

(30) Foreign Application Priority Data

Feb. 18, 2002 (DE) .......................................... 102 06 557

(51) Int. Cl.$^7$ ............................ C08J 3/02; C08K 3/20; C08L 57/02; C08F 16/06; C08G 63/48
(52) U.S. Cl. ....................... 524/457; 523/305; 523/351; 524/2; 524/4; 524/5; 524/8; 524/25; 524/27; 524/31; 524/32; 524/35; 524/47; 524/48; 524/366; 524/458; 524/459; 524/460; 524/499; 525/55; 525/56; 525/61
(58) Field of Search ................................ 523/305, 351; 524/2, 4, 5, 8, 25, 27, 31, 32, 35, 47, 48, 366, 457, 458, 459, 460, 499; 525/55, 56, 61

(56) References Cited

U.S. PATENT DOCUMENTS

| 4,145,494 A | 3/1979 | Neubert |
| 4,501,845 A | 2/1985 | Baus et al. |
| 6,429,251 B2 * | 8/2002 | Mayer et al. ............... 524/459 |

FOREIGN PATENT DOCUMENTS

EP 0 538 572 4/1993

* cited by examiner

Primary Examiner—Patrick D. Miland
(74) Attorney, Agent, or Firm—Oblon, Spivak, McClelland, Maier & Neustadt, P.C.

(57) ABSTRACT

Process for the preparation of protective colloid-stabilized aqueous dispersions.

26 Claims, No Drawings

PROCESS FOR THE PREPARATION OF PROTECTIVE COLLOID-STABILIZED AQUEOUS DISPERSIONS

BACKGROUND OF THE INVENTION

1. Field of the Invention

The present invention relates to a process for the preparation of protective colloid-stabilized aqueous dispersions, and the use thereof.

2. Description of the Background

Dispersions comprising hydrophobic monomers, such as styrene or butadiene, which are stabilized with polar protective colloids, such as PVA or hydroxyethylcellulose (HEC), are difficult to prepare because they are very viscous (U.S. Pat. No. 4,670,505). These copolymers are as a rule therefore stabilized by more efficient ionic and nonionic emulsifiers which result in a lower viscosity in the process. The protective colloid imparts to the dispersion rheological and adhesion properties which differ from those imparted by the emulsifier, which also adversely affects the water resistance of the dispersion.

Protective colloid-stabilized dispersions can be dried by spray-drying to give a redispersible powder which results in good processibility and an improvement in the mechanical properties in hydraulically setting systems. Such redispersible powders are used in large amounts in construction applications. Virtually exclusively powders based on polar monomers, such as vinyl acetate or vinyl chloride, or vinyl acetate/ethylene copolymers or vinyl acetate/veova copolymers have been prepared to date. Owing to the higher polarity, the polymerization with polar protective colloids presents no problems and is not comparable with hydrophobic monomers, such as styrene or 1,3-butadiene.

Owing to the interesting properties, protective colloid-stabilized dispersions based on hydrophobic monomers and the possibility of spray-drying them to give a redispersible powder, a process for the preparation of protective colloid-stabilized dispersions based on vinylaromatics and 1,3-dienes is of considerable economic interest.

Freeing emulsifier-stabilized dispersions based on vinylaromatics and 1,3-dienes from residual monomers and readily volatile impurities by steam distillation is known. The residual monomer content at the end of polymerization is below 1%. In addition to a low process viscosity, the aim of the preparation process according to the invention for the protective colloid-stabilized dispersions based on hydrophobic monomers is to achieve a final conversion of >99%. This is of considerable economic interest since the larger the amount of residual monomers the greater are the resulting amounts of wastewater, which cause environmental pollution and give rise to disposal costs.

There are numerous known preparation processes for protective colloid-stabilized dispersions based on hydrophobic copolymers, such as styrene/acrylate or styrene/butadiene, which make it possible to control the viscosity in the process but which have disadvantages with respect to the process.

The viscosity of vinyl acetate/(meth)acrylate dispersions having a vinyl acetate content of <50% with the use of PVA or HEC as protective colloid can be reduced by stabilizing auxiliaries, such as allyl alcohol (U.S. Pat. No. 4,670,505), propanol or ethylene glycol (British Patent 1278813). In EP-A 013 478, the viscosity is reduced with water-miscible organic compounds, such as methanol and ethanol. The volatile organic compounds have to be removed after the polymerization.

In EP-A 538 571, the total amount Of protective colloid is initially introduced for regulating the viscosity of dispersions having a styrene content of >50% by mass and/or C1- to C8-alkyl (meth)acrylate and a mixed initiator system consisting of an acidic peroxide and a redox system, or an acidic peroxide or a redox system alone is used. In addition, the viscosity can be reduced by using triethanolamine as a viscosity-regulating compound.

EP-A 821 016 and EP-A 723 975 refer to the viscosity-regulating effect of polar comonomers which are capable of crosslinking during the polymerization itself, such as hydroxyethyl methacrylate or glycidyl (meth)-acrylate, in the polymerization of styrene/acrylates with partially hydrolyzed polyvinyl acetate as protective colloid. The polymerization of styrene/butadiene copolymers is unsuccessful.

WO 99/16794 states that, by using a mixture of protective colloids which differ in the surface tension, it is possible to prepare sterically stabilized styrene/butadiene copolymer dispersions which can be spray-dried to give a cement-stable, redispersible powder. One protective colloid has a surface tension of >40 mN/m in the form of a 2% strength aqueous solution and the other has a surface tension of <40 mN/m in the form of a 2% strength aqueous solution. The styrene/butadiene dispersion thus prepared has a solids content of only 47.0%, which corresponds to a conversion of 93.6%. According to the fundamental formulation in the example, the theoretical solids content would have to be 50.2% in the case of a conversion of 100%. In this process, the fact that a mixture of two different protective colloids has to be used is also disadvantageous.

The preparation of a sterically stabilized dispersion of a styrene/butadiene copolymer, which can be spray-dried to give a redispersible powder, using only one protective colloid is effected in WO 99/28360 by initially introducing some of the protective colloid and metering some. The very large particle sizes of the dispersion, from about 2.5 µm to 4.5 µm, constitute a disadvantage of this process. Experience has shown that dispersions having these particle sizes (substantially above 1 µm) are not storage-stable. A part of the monomers has to be initially introduced and a part metered. If all monomers are added during the polymerization, the conversion of the polymerization is not complete.

With the support of a mercaptosilane, a butadiene-containing, protective colloid-stabilized dispersion is prepared with partially hydrolyzed polyvinyl alcohol in WO 97/15603. The limitation to the mercaptosilane and the high costs of the silane constitute a disadvantage of this process.

Accordingly, there remains a need for improved processes for the preparation of protective colloid-stabilized, emulsifier-free aqueous dispersions of copolymers.

SUMMARY OF THE INVENTION

The object of the invention was to provide a process for the preparation of emulsifier-free, protective colloid-stabilized aqueous dispersions of styrene/butadiene copolymers which overcomes the described disadvantages described above, in particular the regulation of the viscosity using organic solvents, requires no protective colloids or mercaptosilanes which are expensive to prepare and makes it possible to establish the mean particle diameters below stable colloid dimensions of 1,000 nm and permits polymerization to a conversion of >99% and offers the possibility of preparing readily redispersible plastics powders by drying the dispersion.

The invention relates to a process for the preparation of protective colloid-stabilized, emulsifier-free, aqueous dispersions based on at least two monomers selected from vinylaromatics and 1,3-dienes in the presence of auxiliaries, optionally further comonomers in an amount of 0.1% by weight to 20% by weight, based on the total amount of monomers, wherein 0.01 to 0.4% by weight of an oil-soluble regulator is added to the reaction vessel at a conversion of 60 to 80%, based on 100% of the monomers, and a further 0.01 to 0.4% by weight of an oil-soluble regulator is added at a conversion of 80% to 95%, based on 100% of monomers.

Thus, in one embodiment, the present invention provides a process for the preparation of a protective colloid-stabilized, emulsifier-free, aqueous dispersion of a copolymer, comprising:

polymerizing in water at least two monomers selected from the group consisting of vinylaromatics and 1,3-dienes, at least one protective colloid, and other auxiliaries, wherein 0.01 to 0.4% by weight of an oil-soluble regulator is added to the polymerization at a conversion of 60 to 80%, based on 100% of the monomers, and an additional 0.01 to 0.4% by weight of an oil-soluble regulator is added to the polymerization at a conversion of 80% to 95%, based on 100% of the monomers.

The present invention also provides a process for the preparation of redispersible powders, comprising preparing the dispersion as described above, and formulating the dispersion into a redispersible powder.

The present invention also provides a process for the preparation of adhesive compositions, filling compounds, mortars, renders, gypsum building materials, and emulsion paints, comprising preparing the dispersion according to the process described above, and formulating the dispersion into an adhesive composition, filling compound, mortar, render, gypsum building material, or emulsion paint.

A more complete appreciation of the invention and many of the attendant advantages thereof will be readily obtained as the same becomes better understood by reference to the following detailed description.

DETAILED DESCRIPTION OF THE INVENTION

Suitable vinylaromatics are styrene and methylstyrene, styrene being preferred. Examples of 1,3-dienes are 1,3-butandiene and isoprene, 1,3-butadiene being preferred. These monomers may be used in any proportion.

Suitable optional comonomers are hydroxy(C1- to C8-alkyl) (meth)acrylates, such as hydroxyethyl acrylate, hydroxyethyl methacrylate, hydroxypropyl acrylate and hydroxy(2-ethylhexyl) acrylate, preferably hydroxyethyl methacrylate; ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid, such as the diethyl and diisopropyl esters, and maleic anhydride, ethylenically unsaturated sulfonic acids or salts thereof, preferably vinylsulfonic acid and 2-acrylamido-2-methylpropanesulfonic acid. Further examples are pre-crosslinking comonomers, such as polyethylenically unsaturated comonomers, such as, for example, divinyl adipate, diallyl maleate or allyl methacrylate, or postcrosslinking comonomers, for example N-methylolacrylamide (NMA), -methylol-methacrylamide (NMMA) or esters of N-methylolacrylamide or of methylolmethacrylamide. Epoxy-functional comonomers, such as glycidyl methacrylate and glycidyl acrylate, are also suitable. Further examples are silicon-functional comonomers, such as acryloyloxypropyltri(alkoxy) and methacryloyloxypropyltri (alkoxy)silanes, vinyltrialkoxysilanes and vinylmethyldioxysilanes, it being possible for the alkoxy groups to be, for example, ethoxy and ethoxypropylene glycol ether radicals. In a preferred embodiment, all of the monomers are added to the reaction vessel in the feed during the polymerization, but may also be partly initially introduced and partly metered.

As discussed above, at least one protective colloid is used in the polymerization. In general, other auxiliaries which are used in the polymerization may be one or more of initiators, activators, pH regulators and molecular weight regulators are used. One or any combination of such auxiliaries may be used.

Examples of protective colloids which can be used are polyvinyl alcohol, polyethylene glycol, modified starch and dextrins, cellulose derivatives, such as hydroxyethylcellulose, hydroxypropylcellulose or carboxymethylcellulose, polyvinylpyrrolidone, polystyrene-b-polyethylene oxide or poly(methacrylate)-b-polyethylene oxide block copolymers and casein. Polyvinyl alcohols having a degree of polymerization of 200 to 2,000 and a degree of hydrolysis of 74 to 99.5% are preferably used in an amount of 1 to 20 parts/100 parts of monomers. This range for the amount of polyvinyl alcohol to monomers ratio includes all specific values and subranges therebetween, such as 2, 5, 8, 10, 12, 15, and 18 parts/100 parts of monomers.

The protective colloid or a protective colloid mixture is initially introduced but can also be divided between initially introduced mixture and feed or can be added in the feed only during the polymerization.

The free radical initiators are peroxides, hydroperoxides, hydrogen peroxide, sodium, potassium or ammonium peroxodisulfate, or azo compounds, alone or in combination. In a preferred embodiment of the invention, water-soluble sodium peroxodisulfate in combination with tert-butyl hydroperoxide is initially introduced in a total amount of 0.01 to 2% by mass, based on the total monomers. This range for the amount of the free radical initiators includes all specific values and subranges therebetween, such as 0.02, 0.05, 0.1, 0.2, 0.5, 0.75, 1, 1.2, 1.5, and 1.75% by mass.

Water-soluble reducing agents, such as sodium, potassium or ammonium sulfite or bisulfite, sodium formaldehyde sulfoxylate or ascorbic acid, act as activators. The activator, in an amount of 0.01 to 2% by mass, based on the total monomers, is preferably metered during the polymerization. This range for the amount of the activator includes all specific values and subranges therebetween, such as 0.02, 0.05, 0.1, 0.2, 0.5, 0.75, 1, 1.2, 1.5, and 1.75% by mass.

In order to establish the pH during the polymerization, one or more buffers, such as, for example, sodium carbonate, sodium bicarbonate, tripotassium phosphate, ethylenediamine tetraacetate or nitrilotriacetic acid, are used. Tertiary amines can be used for support.

For controlling the molecular weight, regulating substances can be used during the polymerization. They are used in amounts of from 0.1 to 3% by mass, based on the total monomers. This range for the amount of the regulating substances includes all specific values and subranges therebetween, such as 0.02, 0.05, 0.1, 0.2, 0.5, 0.75, 1, 1.2, 1.5, 1.75, 2, 2.2, 2.5, and 2.75% by mass. The molecular weight regulators can be initially introduced, added or partly initially introduced and partly added. Examples of such substances are mercaptans, such as, for example, n-dodecyl mercaptan, tert-dodecyl mercaptan, mercaptopropionic acid or methyl mercaptopropionate, or tertiary amines, such as, for example, triethanolamine.

Suitable oil-soluble regulators for addition at a conversion of 60% to 80% and of 80% to 95%, based on 100% of monomer, are mercaptans, such as, for example, n-dodecyl mercaptan, tert-dodecyl mercaptan, mercapto-propionic acid or methyl mercaptopropionate. The addition of the regulator can be effected all at once or continuously over a period in which the conversion is 60% to 80% or 80% to 95%, based on 100% of monomer.

The range for the first addition of the oil-soluble regulators includes all specific values and subranges therebetween, such as 62, 65, 68, 70, 72, and 75%, based on 100% of monomer.

The range for the second addition of the oil-soluble regulators includes all specific values and subranges therebetween, such as 82, 85, 90, and 92%, based on 100% of monomer.

Preferably, the first addition of the oil-soluble regulators is at a conversion of 60% to less than 80% and the second addition is a conversion of greater than 80% to 95%, based on 100% of monomer.

The polymerization temperature is 30° C. to 90° C., preferably 60° C. to 85° C. This range for the temperature includes all specific values and subranges therebetween, such as 40, 45, 50, 55, 65, 70, 75, and 80° C.

The polymerization is preferably carried out in such a way that the total amount of protective colloid is initially introduced and the monomers and other components are fed in during the polymerization. However, it is also possible initially to introduce some of the protective colloid and some of the monomers and to add some of them or initially to introduce the protective colloid and the monomers completely.

The solids content of the prepared dispersion is 30 to 70%, preferably 40 to 60%. This range for the solids content includes all specific values and subranges therebetween, such as 35, 45, 50, 55, and 65%.

After the end of the monomer addition, the polymerization can be continued to a low residual monomer content in a known manner by subsequent initiation.

In one embodiment, the polymer has a glass transition temperature of −40 to +100° C., preferably −20 to +50° C. This range for the glass transition temperature includes all specific values and subranges therebetween, such as −30, −10, 0, +10, +20, +30, +40, +60, +70, +80, +90, and +95° C.

The composition of the copolymer is chosen so that the abovementioned glass transition temperature is reached. The comonomer fraction should be taken into account. The Tg can be calculated approximately in advance by means of the FOX equation. According to FOX T. G., Bull. Am. Physics Soc. 1, 3, page 123 (1956), incorporated herein by reference, the following is true: $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature, in degrees Kelvin, of the homopolymer of the monomer n. Tg values for homopolymers are given in Polymer Handbook 2nd Edition, J. Wiley & Sons, New York (1975), incorporated herein by reference. The glass transition temperature Tg of the polymer can be determined in a known manner by means of differential scanning calorimetry (DSC). These procedures are well-known in the art.

The dispersions according to the invention and powders prepared therefrom are suitable for the preparation of adhesive compositions, such as, for example, tile adhesives, filling compounds, mortars, such as, for example, cement mortars, lime mortars and ready-mixed mortars, renders and gypsum building materials and emulsion paints.

The dispersions according to the invention provides for the preparation of readily redispersible plastics powders by drying the dispersion.

EXAMPLES

Having generally described this invention, a further understanding can be obtained by reference to certain specific examples which are provided herein for purposes of illustration only and are not intended to be limiting unless otherwise specified.

Determination of the Conversion

Samples were taken hourly in the laboratory reactor and the solids content of said samples was determined gravimetrically. With the aid of EXCEL, the conversion based on the total amount of the monomers used was calculated.

Spray-Drying of the Dispersions 10 parts of PVA (in the form of an about 20% strength solution)/100 parts of dispersion solid were added to the dispersions and the latter were adjusted to a solids content of 35%. The latex was dried in air by the concurrent method in a spray-drying apparatus. 10% (based on solids content) of a talc/dolomite mixture (1:1) were used as an antiblocking agent, said mixtures being added parallel to the feed during the drying.

Particle Size After Redispersing in Water with and without Ultrasonic Treatment

The powder was dispersed in water and diluted to a concentration of 0.1%. The particle size distribution was measured using a Microtrac X-100 from Malvern before and after ultrasonic treatment of 900 s.

Example 1

398.7 g of water, 361 g of an 18.7% strength PVA solution (degree of hydrolysis about 87%), 1.35 g of EDTA, 2.7 g of tert-dodecyl mercaptan and 2.7 g of triethanolamine were initially introduced into a 5 liter pressure resistant autoclave having a paddle stirrer and jacket heating and were heated to 75° C. When the internal reactor temperature remained constant, 1.35 g of sodium peroxodisulfate and 11.57 g of tert-butyl hydroperoxide (70% strength) are added all at once. Parallel with this, 379.8 g of a 3.6% strength by weight PVA solution are added in the course of one hour. Five minutes after the sodium peroxodisulfate and tert-butyl hydroperoxide addition, 796.5 g of styrene, 459 g of butadiene, 94.5 g of hydroxyethyl methacrylate and 5.4 g of tert-dodecyl mercaptan are introduced into the reactor in five hours. Four hours after the beginning of the addition of the monomers and of the tert-dodecyl mercaptan, 379.8 g of a 3.6% strength by weight PVA solution are introduced into the reactor in the course of one hour. Parallel with this, 369.1 g of a 2.24% strength by weight sodium formaldehyde sulfoxylate solution are added in the course of six hours. After the end of the monomer metering, 2.7 g of tert-butyl hydroperoxide (70% strength by weight) and 2.7 g of tert-dodecyl mercaptan are added all at once. After the end of the addition of the sodium formaldehyde sulfoxylate solution, the temperature is reduced from 75° C. to 70° C. in the course of five minutes. Two hours after the end of the monomer addition, a further 2.7 g of tert-dodecyl mercaptan are added all at once. The conversion at this time is 82%, based on 100% of monomer. After a total operating time of eleven hours, the batch is cooled to room temperature and stopped with diethylamine.

At a conversion of 100%, the solids content would have to be 45%. Since, however, samples for determining the conversion were taken hourly, monomer has been removed from the system, with the result that the solids content is only 44.3%. The residual styrene content of the dispersion is 0.175% (GC headspace determination), which corresponds to a conversion of more than 99%. The batch was stirred for 24 h in an open container at 65° C. in order to remove the residual styrene and other impurities. Thereafter, the batch had a Rheomat viscosity of 1 050 mPas (shear rate 99 l/s), a particle size of 261 nm and a pH of 7.0 at a solids content of 49.9%.

The dispersion was dried by spray-drying to give a powder which has good redispersibility. The powder disperses immediately in water to a median particle size of $D_{50}$=32.01 μm and, after ultrasonic treatment for 900 s, to a median particle size of $D_{50}$=10.45 μm.

Comparative Example 1

The batch was prepared analogously to Example 1, but the second tert-dodecyl mercaptan addition all at once, two hours after the end of the monomer addition at a conversion of >80%, based on 100% of monomer, was dispensed with. The batch has a residual styrene content of 0.31% at a solids content of 44.7%, which corresponds to a conversion of 99.3% at a theoretical solids content of 45%. In this experiment, no samples were taken for determining the conversion. The batch was freed from residual styrene and volatile impurities as described above and concentrated to a solids content of 50.4%. The viscosity was so high that it was not measurable.

Comparative Example 2

The batch was prepared analogously to Comparative Example 1 but the tert-dodecyl mercaptan addition after the end of the monomer addition at a conversion of more than 60%, based on 100% of monomer, was dispensed with. Eight hours after the beginning of the polymerization by addition of the initiators tert-butyl hydroperoxide and sodium peroxodisulfate, the batch has coagulated. This was evident from an abrupt stoppage of the stirrer in the eighth hour.

The preparation process according to the invention from example 1 permits the protective colloid-stabilized polymerization of hydrophobic monomers, such as, for example, vinylaromatics and 1,3-dienes, to a final conversion of >99%. The virtually complete conversion of the monomers has economic advantages. The residual styrene content of less than 1% by weight is a value which corresponds to the prior art in the case of emulsifier-stabilized carboxylated styrene/butadiene dispersions. Comparative Examples 2 and 3 show that a high final conversion in the protective colloid-stabilized polymerization of hydrophobic monomers leads to a critical increase in the viscosity. Only the addition of an oil-soluble regulator toward the end of the polymerization permits a high final conversion and a low process viscosity. The powder prepared from the dispersion according to the invention has good redispersibility and is suitable for use in hydraulically setting systems for improving the processibility and the mechanical properties.

Obviously, numerous modifications and variations of the present invention are possible in light of the above teachings. It is therefore to be understood that within the scope of the appended claims, the invention may be practiced otherwise than as specifically described herein.

This application is based on German patent application serial No. 102 06 557.8, filed on Feb. 18, 2002, and incorporated herein by reference.

What is claimed is:

1. A process for the preparation of a protective colloid-stabilized, emulsifier-free, aqueous dispersion of a copolymer, comprising:
   polymerizing in water at least two monomers selected from the group consisting of vinylaromatics and 1,3-dienes, at least one protective colloid, and other auxiliaries,
   wherein
   0.01 to 0.4% by weight of an oil-soluble regulator is added to the polymerization at a conversion of 60 to 80%, based on 100% of the monomers, and
   an additional 0.01 to 0.4% by weight of an oil-soluble regulator is added to the polymerization at a conversion of 80% to 95%, based on 100% of the monomers.

2. The process of claim 1, wherein additional comonomers in an amount of 0.1% by weight to 20% by weight, based on the total amount of monomers, are also polymerized.

3. The process of claim 1, wherein the vinylaromatics are selected from the group consisting of styrene and methylstyrene.

4. The process of claim 1, wherein the 1,3-dienes are selected from the group consisting of 1,3-butadiene and isoprene.

5. The process of claim 1, wherein the monomers are the vinylaromatics.

6. The process of claim 1, wherein the monomers are the 1,3-dienes.

7. The process of claim 1, wherein the monomers comprise styrene and 1,3-butadiene.

8. The process of claim 1, wherein the monomers comprise at least one of the vinylaromatics and at least one of the 1,3-dienes.

9. The process of claim 1, wherein the vinylaromatics are selected from the group consisting of styrene and methylstyrene.

10. The process of claim 1, wherein the 1,3-dienes are selected from the group consisting of 1,3-butandiene and isoprene.

11. The process of claim 1, wherein
    the vinylaromatics are selected from the group consisting of styrene and methylstyrene, and
    the 1,3-dienes are selected from the group consisting of 1,3-butandiene and isoprene.

12. The process of claim 1, wherein the additional auxiliaries are selected from the group consisting of initiators, activators, pH regulators, and molecular weight regulators.

13. The process of claim 1, wherein the protective colloid is selected from polyvinyl alcohols, polyethylene glycol, modified starch, dextrins, cellulose derivatives, polyvinyl pyrrolidone, polystyrene-b-polyethylene oxide or poly (methacrylate)-b-polyethylene oxide block copolymers, casein, and mixtures thereof.

14. The process of claim 12, wherein the initiators are selected from the group consisting of peroxides, hydroperoxides, hydrogen peroxide, sodium, potassium or ammonium peroxodisulfate, azo compounds, and mixtures thereof.

15. The process of claim 12, wherein the pH regulators used are selected from the group consisting of sodium carbonate, sodium bicarbonate, tripotassium phosphate, ethylenediamine tetraacetate, nitrilotriacetic acid, and mixtures thereof.

16. The process of claim 12, wherein the molecular weight regulators are selected from the group consisting of n-dodecyl mercaptan, tert-dodecyl mercaptan, mercaptopropionic acid, methyl mercaptopropionate, triethanolamine, and mixtures thereof.

17. The process of claim 2, wherein the additional comonomers are selected from the group consisting of hydroxy(C1- to C8-alkyl) (meth)acrylates, ethylenically unsaturated mono- and dicarboxylic acids, ethylenically unsaturated carboxamides and carbonitriles, mono- and diesters of fumaric acid or maleic acid, ethylenically unsaturated sulfonic acids or their salts, precrosslinking comonomers, postcrosslinking comonomers, epoxy-functional comonomers, silicon-functional comonomers, and mixtures thereof.

18. The process of claim 2, wherein the additional comonomers are selected from the group consisting of hydroxyethyl acrylate, hydroxyethyl methacrylate, hydroxypropyl acrylate, hydroxy(2-ethylhexyl) acrylate, acrylic acid, methacrylic acid, fumaric acid, maleic acid, acrylamide, acrylonitrile, diethyl and/or diisopropyl esters of fumaric acid and maleic acid, maleic anhydride, vinylsulfonic acid, 2-acrylamido-2-methylpropanesulfonic acid, divinyl adipate, diallyl maleate, allyl methacrylate, N-methylolacrylamide (NMA), N-methylolmethacrylamide (NMMA), esters of N-methylolacrylamide or of ethylolmethacrylamide, glycidyl methacrylate, glycidyl acrylate, acryloyloxypropyltri(alkoxy) and methacryloyloxy-propyltri(alkoxy)silanes, vinyltrialkoxysilanes, and vinylmethyldialkoxysilanes, and mixtures thereof.

19. The process of claim 18, wherein the alkoxy groups are ethoxy or ethoxypropylene glycol ether radicals.

20. The process of claim 1, wherein the polymerization temperature is 30 to 90° C.

21. The process of claim 1, wherein the ratio of solid to water is adjusted to give a solids content of the prepared dispersion of 30 to 70%.

22. The process of claim 1, wherein the total amount of protective colloid is initially introduced and the monomers and auxiliaries are fed in during the polymerization.

23. The process of claim 1, wherein
the addition of the 0.01 to 0.4% by weight of the oil-soluble regulator is at a conversion of 60% to less than 80%, based on 100% of the monomer, and
an addition of the additional 0.01 to 0.4% by weight of the oil-soluble regulator is conducted at a conversion of greater than 80% to 95%, based on 100% of monomer.

24. The process of claim 1, wherein the oil-soluble regulator is selected from the group consisting of n-dodecyl mercaptan, tert-dodecyl mercaptan, mercapto-propionic acid, and methyl mercaptopropionate.

25. A process for the preparation of redispersible powders, comprising preparing the dispersion according to the process of claim 1, and formulating the dispersion into a redispersible powder.

26. A process for the preparation of adhesive compositions, filling compounds, mortars, renders, gypsum building materials, and emulsion paints, comprising preparing the dispersion according to the process of claim 1, and formulating the dispersion into an adhesive composition, filling compound, mortar, render, gypsum building material, or emulsion paint.

* * * * *

UNITED STATES PATENT AND TRADEMARK OFFICE
CERTIFICATE OF CORRECTION

PATENT NO. : 6,780,918 B2
DATED : August 24, 2004
INVENTOR(S) : Davide Brizzolara Page 1 of 1

It is certified that error appears in the above-identified patent and that said Letters Patent is hereby corrected as shown below:

<u>Title page,</u>
Item [73], Assignee, "PolymerLatex GmbH & Co. KG., Marl" should read -- Polymer Latex GmbH & Co. KG, Marl --;
"Primary Examiner-Patrick Miland" should read -- Primary Examiner-Patrick Niland --.

<u>Column 8,</u>
Line 17, "60 to" should read -- 60% to --;
Line 45, "1,3-butandiene" should read -- 1,3-butadiene --;
Line 51, "1,3-butandiene" should read -- 1,3-butadiene --;
Lines 58-59, "poly(methacrylate)" should read -- poly-(methacrylate) --.

<u>Column 9,</u>
Line 11, "hydroxy(C1 to C8-alkyl)" should read -- hydroxy(Ci to Ca-alkyl) --;
Lines 21-22, "hydrox-ypropyl" should read -- hydroxypropyl --;
Line 32, "methacryloyloxy-propyltri(alkoxy) silanes" should read
-- methacryloyloxypropyltri(alkoxy) silanes --.

<u>Column 10,</u>
Line 14, "monomer, and" should read -- monomers, and --;
Line 17, "of monomer" should read -- of the monomers --;
Line 20, "mercapto-propionic" should read -- mercaptopropionic --.

Signed and Sealed this

Seventeenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,780,918 B2  Page 1 of 1
DATED : August 24, 2004
INVENTOR(S) : Davide Brizzolara It is certified that error appears in the above-identified patent and that said Letters Patent is hereby corrected as shown below:

<u>Column 9,</u>
Line 11, "hydroxy(Ci to Ca-alkyl)" should read -- hydroxy($C_{1-8}$ alkyl) --.

Signed and Sealed this

Seventh Day of February, 2006

JON W. DUDAS
*Director of the United States Patent and Trademark Office*